US009760722B2

(12) United States Patent
Albrecht

(10) Patent No.: US 9,760,722 B2
(45) Date of Patent: Sep. 12, 2017

(54) METHOD FOR REPORTING AND ADDRESSING AN UNAUTHORIZED DISCLOSURE OF CLASSIFIED INFORMATION AT AN IMAGING DEVICE

(71) Applicant: Lexmark International Technology Sarl, Genève (CH)

(72) Inventor: Kevin James Albrecht, Shawnee, KS (US)

(73) Assignee: KOFAX INTERNATIONAL SWITZERLAND SARL, Geneva (CH)

( * ) Notice: Subject to any disclaimer, the term of this patent is extended or adjusted under 35 U.S.C. 154(b) by 34 days.

(21) Appl. No.: 14/815,529

(22) Filed: Jul. 31, 2015

(65) Prior Publication Data

US 2017/0032134 A1    Feb. 2, 2017

(51) Int. Cl.
*G06F 7/04*     (2006.01)
*H04L 29/06*    (2006.01)
*G06F 12/14*    (2006.01)
*G06F 21/60*    (2013.01)
*G06F 21/44*    (2013.01)
*G06F 21/30*    (2013.01)
*G06F 21/74*    (2013.01)

(52) U.S. Cl.
CPC .......... *G06F 21/608* (2013.01); *G06F 21/305* (2013.01); *G06F 21/445* (2013.01); *G06F 21/74* (2013.01); *G06F 2221/2143* (2013.01)

(58) Field of Classification Search
CPC .... G06F 21/608; G06F 21/445; G06F 21/305; G06F 21/74; G06F 2221/2143; H04L 63/0876; H04L 63/0869

USPC ...................... 726/27, 26; 713/165, 166, 187
See application file for complete search history.

(56) References Cited

U.S. PATENT DOCUMENTS

| | | | |
|---|---|---|---|
| 8,675,063 B2 | 3/2014 | Bentkovski | |
| 9,141,319 B2 | 9/2015 | Chapman et al. | |
| 2010/0122331 A1* | 5/2010 | Wang | G06F 21/31 726/6 |
| 2011/0055917 A1* | 3/2011 | Wickstrom | G06F 21/10 726/17 |
| 2011/0109932 A1 | 5/2011 | Lee | |
| 2013/0050727 A1 | 2/2013 | Murata | |
| 2013/0055350 A1* | 2/2013 | Belanger | G06F 21/31 726/3 |
| 2013/0077118 A1 | 3/2013 | Komiyama | |
| 2013/0145083 A1* | 6/2013 | Suzuki | G06F 12/0246 711/103 |
| 2013/0166910 A1* | 6/2013 | Wilkinson | H04W 12/04 713/168 |

(Continued)

*Primary Examiner* — Aravind Moorthy
(74) *Attorney, Agent, or Firm* — Zilka-Kotab, P.C.

(57) ABSTRACT

A method of addressing an unauthorized disclosure of sensitive information at an imaging device, including receiving an indication of the unauthorized disclosure of sensitive information; receiving or generating preliminary information about the unauthorized disclosure; and transmitting the indication and the preliminary information to a remote location to initiate an investigation on the unauthorized disclosure. After receiving the indication, the method includes entering a reduced function mode by the imaging device; receiving a clearance key when in the reduced function mode; and after receiving the clearance key, exiting the reduced function mode and entering a normal mode of operation.

20 Claims, 3 Drawing Sheets

(56) References Cited

U.S. PATENT DOCUMENTS

| | | | |
|---|---|---|---|
| 2013/0222836 A1* | 8/2013 | Kakegawa | G06F 21/55 358/1.14 |
| 2014/0245398 A1* | 8/2014 | Son | H04L 63/10 726/4 |
| 2015/0098106 A1 | 4/2015 | Chapman et al. | |

* cited by examiner

METHOD FOR REPORTING AND ADDRESSING AN UNAUTHORIZED DISCLOSURE OF CLASSIFIED INFORMATION AT AN IMAGING DEVICE

CROSS REFERENCE TO RELATED APPLICATIONS

None

STATEMENT REGARDING FEDERALLY SPONSORED RESEARCH OR DEVELOPMENT

None.

REFERENCE TO SEQUENTIAL LISTING, ETC.

None.

BACKGROUND

1. Technical Field

The present disclosure relates to reporting an incident at an imaging device. More particularly, it relates to a method of reporting an unauthorized disclosure of sensitive and/or classified information at an imaging device.

2. Description of the Related Art

The unintentional disclosure of classified information (UDCI), or "spillage," is a security incident that results in the transfer of classified information onto an information system not accredited (i.e., authorized) for the appropriate security level. A UDCI is considered to be a greater threat to national security and occurs on much greater frequency than the intentional disclosure of classified information, or "leakage." For example, soldiers returning from a tour of duty print and copy incident reports without caring about the classification level of a multifunction product (MFP) they use. As a result, this "unclassified MFP" is then contaminated with classified information. Even if the soldier processing a document realizes his mistake and cancels the processing job, the MFP may still retain some of the classified information from the document the soldier was processing. Further, merely cancelling the job does not inform the relevant personnel of the possibility of the MFP being contaminated with classified information, and the soldier or user in question may not report the incident, thinking that cancelling the job is equivalent to sufficiently addressing the UDCI.

The procedure to address a UDCI often includes notifying specific people, such as personnel who are part of an investigation team, about the event and completing a number of forms for approval by appropriate personnel. The complexity of the procedure becomes increasingly difficult the longer the UDCI event goes unreported. Given any delay in the discovery of a UDCI, the investigation team encounters a greater difficulty identifying exactly when the contamination took place, which increases the time and expense in fully addressing the UDCI event. As result, millions of dollars are spent annually by organizations, such as government offices and private companies, to clean up UDCI incidents from unauthorized information systems, applications or media.

SUMMARY

Example embodiments overcome shortcomings in existing systems. According to an example embodiment, there is disclosed a method of correcting for an unauthorized disclosure of sensitive information at an imaging device, including: receiving, by the imaging device, an indication of the unauthorized disclosure of sensitive information, and receiving or generating preliminary information about the unauthorized disclosure; and transmitting the indication and the preliminary information to a remote location to initiate an investigation on the unauthorized disclosure. According to the example embodiment, after receiving the indication, the method includes the imaging device entering a reduced function mode. The reduced function mode enables the imaging device to perform a reduced set of functions relative to a set of functions that are enabled to be performed during a normal mode of operation. The method further includes receiving a clearance key when in the reduced function mode and after receiving the clearance key, exiting the reduced function mode and returning the imaging device to the normal mode of operation. The indication may be received via a user interface of the imaging device.

The method may further include determining if a predetermined event occurs following the document being processed and prior to receiving the indication, and upon an affirmative determination, querying the user for preliminary information via the user interface. The preliminary information includes at least one of a time when the unauthorized disclosure occurred, an identifier of the imaging device, and at least one document involved in the unauthorized disclosure. Upon a negative determination, the preliminary information is automatically collected, including at least one of a time when the unauthorized disclosure occurred, an identifier of the imaging device, and at least one document involved in the unauthorized disclosure. An example method further includes receiving, together with or as part of the clearance key, instructions to wipe memory locations in imaging device memory containing the at least one document involved in the unauthorized disclosure, processing the instructions and in response to processing the instructions, wiping the memory locations.

BRIEF DESCRIPTION OF THE DRAWINGS

The above-mentioned and other features and advantages of the present disclosure, and the manner of attaining them, will become more apparent and will be better understood by reference to the following description of example embodiments taken in conjunction with the accompanying drawings. Like reference numerals are used to indicate the same element throughout the specification.

DETAILED DESCRIPTION OF THE DRAWINGS

Figure 1:
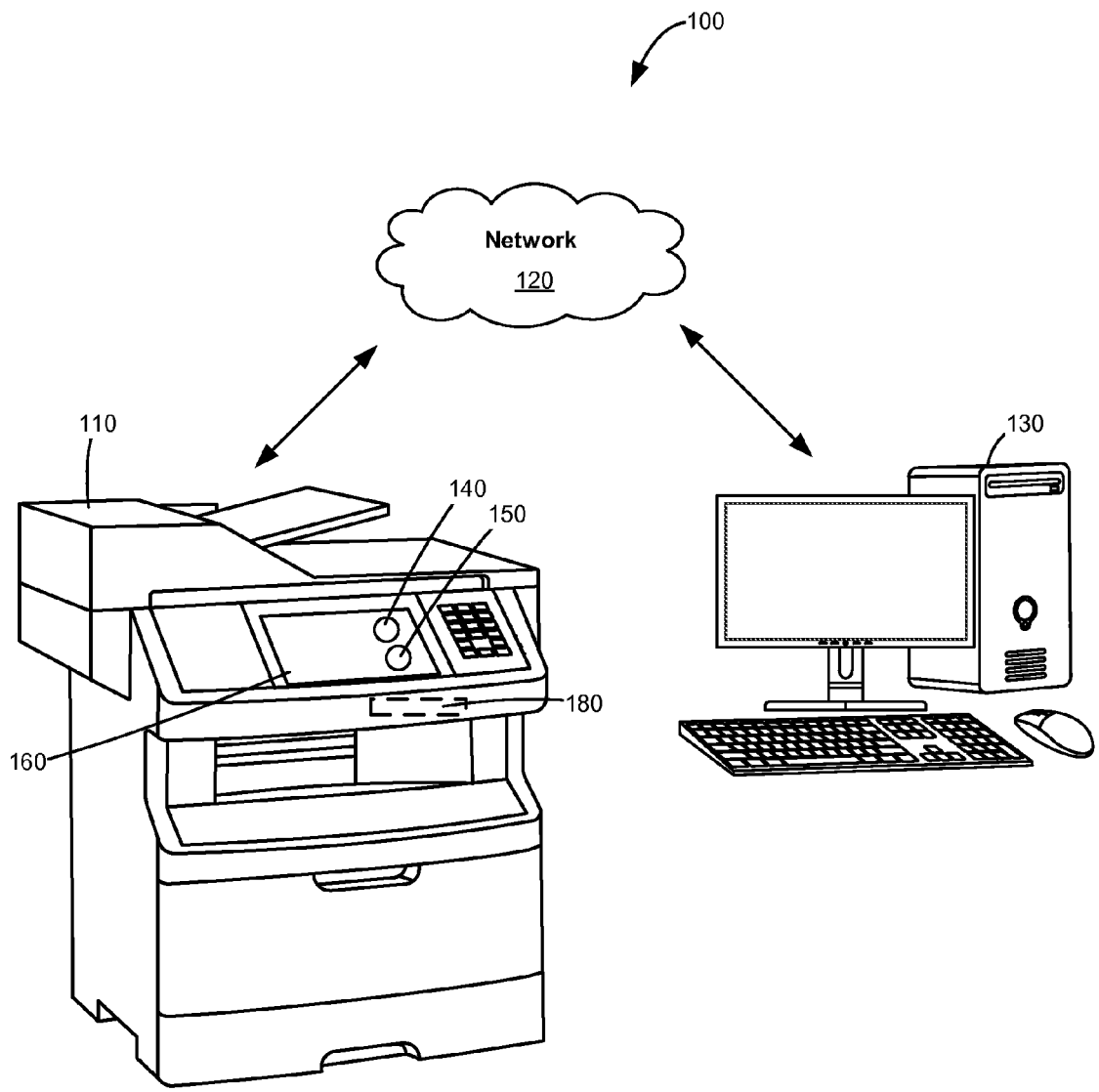
FIG. 1 is one example embodiment of a system including a device connected to a server via a network.

The following description and drawings illustrate embodiments sufficiently to enable those skilled in the art to practice the present disclosure. It is to be understood that the disclosure is not limited to the details of construction and the arrangement of components set forth in the following description or illustrated in the drawings. The disclosure is capable of other embodiments and of being practiced or of being carried out in various ways. For example, other embodiments may incorporate structural, chronological, electrical, process, and other changes. Examples merely typify possible variations. Individual components and functions are optional unless explicitly required, and the sequence of operations may vary. Portions and features of some example embodiments may be included in or substituted for those of others. The scope of the present application encompasses the appended claims and all available equivalents. The following description is, therefore, not to be taken in a limited sense, and the scope of the present disclosure is defined by the appended claims.

Also, it is to be understood that the phraseology and terminology used herein is for the purpose of description and should not be regarded as limiting. The use herein of "including," "comprising," or "having" and variations thereof is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Further, the terms "a" and "an" herein do not denote a limitation of quantity but rather denote the presence of at least one of the referenced item.

It will be further understood that each block of the example flowcharts or diagrams, and combinations of blocks in the example flowcharts or diagrams, respectively, may be implemented by computer program instructions. These computer program instructions may be loaded onto a general purpose computer, special purpose computer, imaging device or other programmable data processing apparatus to produce a machine, such that the instructions which execute on the computer, imaging device or other programmable data processing apparatus may create means for implementing the functionality of each block of the diagrams or combinations of blocks in the diagrams discussed in detail in the description below.

These computer program instructions may also be stored in a non-transitory computer-readable memory that may direct a computer, imaging device or other programmable data processing apparatus to function in a particular manner, such that the instructions stored in the computer-readable memory produce an article of manufacture, including an instruction means that implements the function specified in the block or blocks. The computer program instructions may also be loaded onto a computer, imaging device or other programmable data processing apparatus to cause a series of operational actions or steps to be performed on the device to produce a device implemented process such that the instructions that execute on the device implement the functions specified in the block or blocks. A processor of the computer, imaging device or other programmable data processing apparatus may execute the program instructions.

Accordingly, blocks of the example flowcharts and diagrams support combinations of means for performing the specified functions, combinations of actions or steps for performing the specified functions and program instruction means for performing the specified functions. It will also be understood that each block of the diagrams, and combinations of blocks in the diagrams, may be implemented by special purpose hardware-based computer or imaging systems or combinations of special purpose hardware and computer instructions that perform the specified functions, actions or steps.

Disclosed is a method for reporting a possible UDCI event at an imaging device and addressing the UDCI event in a remedial manner.

FIG. 1 shows one example embodiment of a system 100 for reporting a possible UDCI. System 100 includes an imaging device 110 communicatively connected via network 120 to server 130.

Imaging device 110 may be any device capable of printing or producing a hard copy of a data file, a document stored in electronic form or a hard copy document. For example, imaging device 110 may be a laser, inkjet or dot matrix printer or multi-function printing device that has the capability of performing other functions, such as facsimile or electronic mail communicating, document scanning and/or copying, in addition to printing. Imaging device 110 may be connected to a network 120 via one or more appropriate communication links as understood by those of ordinary skill in the art. Imaging device 110 may include a processor 180, depicted in FIG. 1 in dashed lines to indicate that it is an internal component, for executing programming code for controlling the modules of imaging device 110 to perform imaging functions as directed by a user of imaging device 110.

Network 120 may be any network capable of allowing communications between two or more computing systems, as discussed herein and/or available or known at the time of filing and/or developed after the time of filing. For example, network 120 may be a communications network or network/communications network system such as, but not limited to, a peer-to-peer network, a hybrid peer-to-peer network, a Local Area Network (LAN), a Wide Area Network (WAN), a public network such as the Internet, a private network, a cellular network, or a combination of different network types. Network 120 may be a wireless, a wired, and/or a wireless and wired combination network. Network 120 may also be designated as an unclassified network in which only unclassified information, in the form of data and/or documents, can be reproduced, communicated and otherwise accessed.

Server 130 may be a computing device that hosts content accessible through network 120. Examples of server 130 include but are not limited to a personal computer, a server computer, a series of server computers, a mini computer, and a mainframe computer. Server 130 may also be a web server (or a series of web servers) that hosts enterprise content management (ECM) software provided by, for example, Lexmark.

Described below are a system, device and method for addressing a UDCI event according to example embodiments of the present disclosure. It is understood that addressing the disclosure of classified information is for exemplary purposes only, and that the example embodiments are capable for use in addressing the unintentional disclosure of sensitive, confidential and/or proprietary information that a corporation or other entity desires to keep private and not otherwise accessible to those who may use devices in network 120.

Figure 2:
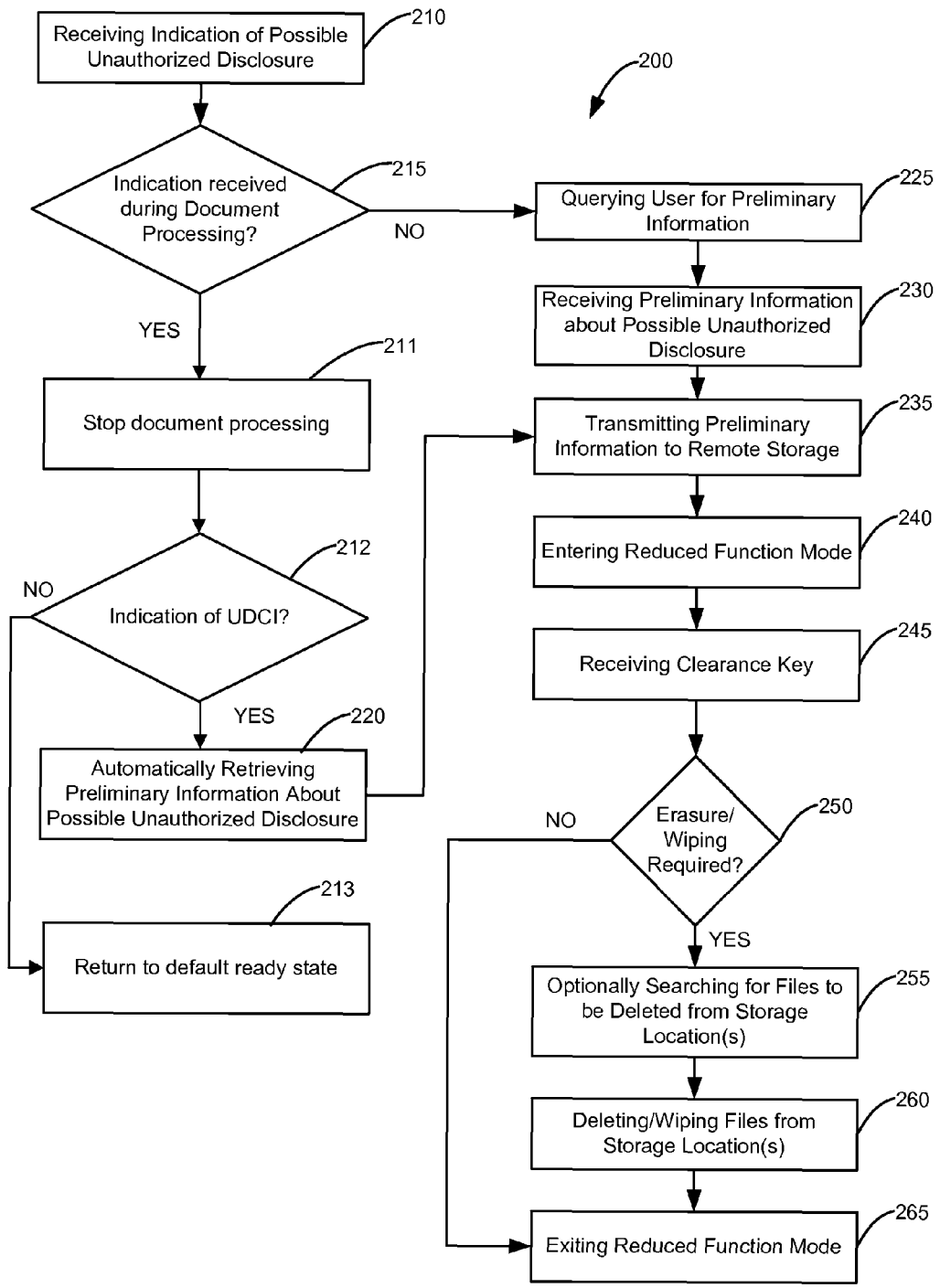
FIG. 2 is an example flowchart of an example method for reporting and otherwise addressing a possible UDCI event using the example system of FIG. 1.

FIG. 2 shows one example method 200 of reporting and otherwise dealing with a possible unauthorized disclosure of classified and/or sensitive information at imaging device 110. Processor 180 of imaging device 110 may execute instructions of program code maintained in non-transitory memory thereof for performing the method of FIG. 2.

Initially, a possible UDCI event may occur at imaging device 110. The possible UDCI may be processing (e.g., printing, scanning, copying and/or sending by facsimile) a classified document using imaging device 110. For example, a user of imaging device 110, connected to unclassified network 120, logs into imaging device 110 and commences a login session by, for example, using the user's access card or badge in order to access the functions of imaging device 110 that are conventionally available. In this case, the login session is to release a print job, make a copy and/or scan a document. During document processing, the user may realize that the document is classified and thus impermissible to be processed on imaging device 110, and presses a STOP button 140 of display interface 160 of imaging device 110 (see FIG. 1). The STOP button 140 may be conventionally used for cancelling an ongoing document processing job. Alternatively, the STOP button 140 or another button, such as a REPORT button 150 of display interface 160 (FIG. 1), may be pressed following completion of document processing. In still another alternative, the STOP button 140 or REPORT button 150 may be pressed following document processing and following the user having terminated his/her login session on imaging device 110. It is understood that the STOP button 140 and REPORT button 150 may be virtual buttons appearing on a touch screen of display interface 160 of imaging device 110, or a physical button on imaging device 110.

In response to the button being pressed, imaging device 110 receives an indication of the possible UDCI at 210. In the event the indication is received during processing of the document, imaging device 110 interrupts document processing at 211. If STOP button 140 was pressed, imaging device determines at 212 whether the user pressed STOP button 140 to report a UDCI or to cancel the current document processing. If it is determined that the user simply intends to cancel the document processing, imaging device 110 returns to a default ready state at 213 to continue the previously interrupted document processing, to perform the intended document processing from its beginning, or to take other action desired by the user. If it is determined that the user intends to report a possible UDCI, imaging device 110 commences reporting of the UDCI.

If it is determined that the indication is to report a UDCI, imaging device 110 automatically retrieves, at block 220, preliminary information about the possible UDCI, including, but no limited to, user information and document information. The preliminary information may include metadata of imaging device 110, and/or user metadata. The preliminary information is automatically retrieved by imaging device 110 due to the fact that the user has not terminated the login session and processing was ongoing at the time the indication was received by imaging device 110.

Alternatively, if the indication is received a period of time after document processing associated with the UDCI event has been completed and/or the user had terminated the user's login session (and since initiated a new login session with imaging device 110), imaging device 110 prompts the user, at block 225, to enter preliminary information as answers to a series of questions. In an example embodiment, the questions may be presented to and the answers provided by the user via display interface 160 of imaging device 110. Preliminary information may relate to, for example, the approximate date and/or time of the possible UDCI, the document itself, etc. The preliminary information may also include metadata of imaging device 110, and/or user metadata. Imaging device 110 receives this information at block 230.

At block 235, imaging device 110 sends the preliminary information from blocks 220 or 230 to server 130. The preliminary information is sent to server 130 to initiate an investigation to determine the veracity and scope of the possible UDCI. In some example embodiments, imaging device 110 does not inform the user that user information is being sent to server 130 along with the preliminary information. The preliminary information, along with any other information, may be in the form of a report. In another example embodiment, imaging device 110 electronically sends the preliminary information collected in blocks 220 or 230 to an individual or group of individuals. For instance, imaging device 110 sends the preliminary information to an individual or group via email, but it is understood that imaging device 110 may send the preliminary information via other communications mechanisms. The person or group may be authorized for receiving the preliminary information and for initiating a workflow for investigating the possible UDCI. Imaging device 110 may be configured to automatically identify the individual or group.

At block 240, after sending the preliminary information to server 130 at block 235, imaging device 110 enters a reduced function mode. In the reduced function mode, imaging device 110 disconnects from network 120 so that it cannot be remotely accessed or otherwise communicate with other devices on network 120, limits the number of functions available to a user and refuses processing of further documents until a clearance key is received and processed. In one example embodiment, all functions available during a normal mode of operation are unavailable during the reduced function mode, with the exception of relatively small set of functions accessible by a relatively small set of users, such as administrative type functions and functions for restoring imaging device 110 to a normal mode of operation. Additionally, imaging device 110 displays a notice whenever a user attempts to initiate a login session when imaging device 110 is in the reduced function mode, informing the user that a possible UDCI has been reported on imaging device 110 that requires a clearance key before returning to a normal function mode of operation. In some example embodiments, imaging device 110 occasionally temporarily connects to network 120 and "pings" server 130 to check the availability of a clearance key. In another example embodiment, functions that do not alter the contents of memory of imaging device 110 are accessible during the reduced function mode.

At block 245, after the possible UDCI has been investigated and resolved, imaging device 110 receives a clearance key for taking steps prior to resuming normal imaging functions. The clearance key may be a code that includes or is otherwise associated with instructions to perform one or more operations by imaging device 110 to prepare imaging device 110 for normal use. For example, one instruction may be to wipe or otherwise erase data relating to at least one document, in this case the document associated with the UDCI event, from the memory of imaging device 110. It is understood that other operations may be performed on imaging device 110 in addition or in the alternative to wiping/erasing memory locations containing data relating to the document for preparing imaging device 110 for normal use. In one embodiment, the instructions provide the memory locations containing the data that are to be wiped or erased. In another embodiment, instructions may be to search for the data relating to the document associated with the UDCI event, and then to wipe or otherwise erase the memory locations identified by imaging device 110.

In some example embodiments, imaging device 110 receives the clearance key from server 130 such that the memory of imaging device 110 and the subsequent reconnection of imaging device 110 into network 120 occur automatically. In this case, when imaging device 110 temporarily connects to network 120 and "pings" server 130 to check the availability of a clearance key, imaging device 110 may detect the received key and automatically take steps to return to the normal mode of operation. In other example embodiments, the clearance key is received via a user, such as a user authorized to initiate a login session during the time imaging device 110 is in the reduced function mode, inputting the clearance key into display interface 160 of imaging device 110, thereby restarting imaging device 110 and reconnecting same to network 120.

After receiving the clearance key at block 245, imaging device 110 determines at block 250 if any document data needs to be wiped or otherwise erased from memory. Upon a negative determination, imaging device 110 automatically reconnects to network 120 and resumes normal functions at block 265. Upon a positive determination, however, the clearance key provides the memory locations to be wiped or erased, according to one example embodiment, and in response imaging device 110 wipes/erases the identified memory locations at block 260. In another example embodiment, imaging device 110 may be instructed to search its memory at block 255 for data or documents that need to be wiped or otherwise erased, and wipe/erase the memory locations having the data or documents at 260.

At block 265, after receiving the clearance key at block 245 and executing any accompanying instructions, imaging device 110 automatically reconnects to network 120. In some example embodiments in which functions that require usage of memory are prohibited during the reduced function mode, reconnecting to network 120 simply involves allowing access to the memory of imaging device 110 and the functions that require the use thereof.

Figure 3:
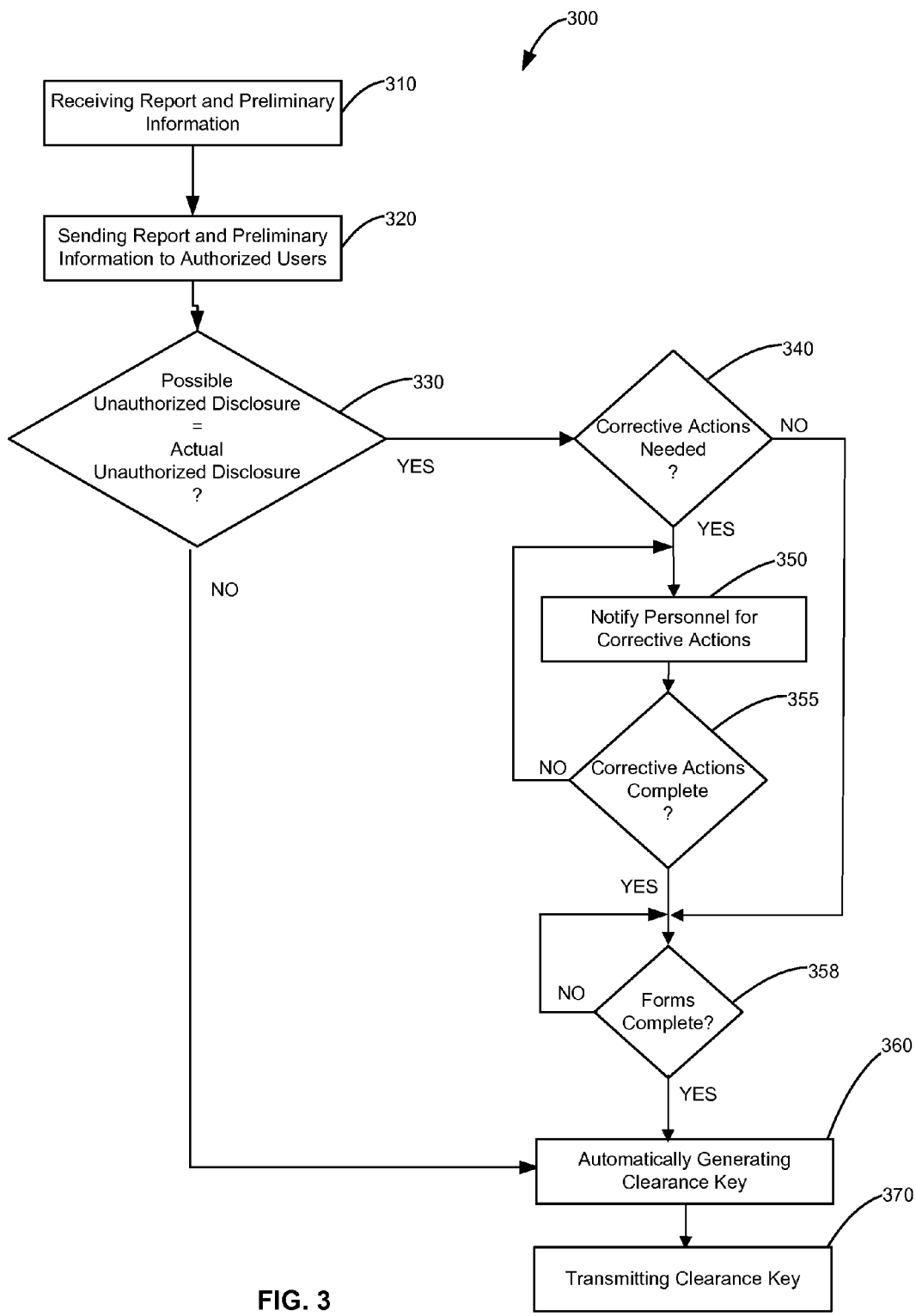
FIG. 3 shows an example flowchart of an example method for monitoring the handling of a reported possible UDCI within the network of FIG. 1.

FIG. 3 shows an example method 300 performed by server 130 for initiating and monitoring an investigation to determine the veracity and scope of a possible UDCI.

At block 310, server 130 receives a report of a possible UDCI from imaging device 110. As mentioned above, the received report may include an indication of a possible UDCI, the preliminary information about the possible UDCI, metadata of imaging device 110, and/or user metadata, etc. In some example embodiments, server 130 has enterprise content management software running, and receiving of the report may create an item on a workflow within the enterprise content management software, thereby initiating an investigation of the possible UDCI.

At block 320, server 130 sends notifications, such as electronic mail notifications, to one or more authorized personnel who are able to determine whether the possible UDCI is an actual UDCI and, if the possible UDCI is an actual UDCI, to determine a set of corrective actions. The notifications may include copies of the received report and forms that need to be completed by the authorized personnel. The forms may include memos, an immediate action checklist, and/or a Five Ws (Who, What, When, Where, Why) report. In some example embodiments, the notifications are sent to multiple authorized users to complete the forms with an annotation, a digital signature and/or an electronic signature. In some alternative embodiments, the notifications are first sent to an authorized user (for example, an information security personnel) responsible for forwarding the notifications to other designated users (such as, for example, executives or other information security personnel) for completing the forms. The enterprise content management software running on server 130 may monitor completion of the forms and issue notifications at predetermined time intervals until the forms have been completed.

At block 330, a determination is made by the authorized personnel in receipt of the report and preliminary information, whether an actual UDCI occurred. Alternatively, server 130 determines, based at least partly upon the report and the preliminary information, whether an actual UDCI occurred. If an actual UDCI is found to have occurred, corrective actions are identified, if any, by server 130 at 340. If corrective actions are needed, an authorized user who is responsible for undertaking the corrective actions is notified by server 130 at block 350.

At block 350, the completed forms are forwarded to the authorized user for corrective actions to be implemented. In some example embodiments, the corrective actions are automatically inserted into the authorized user's task list within the enterprise management system running on server 130. The corrective actions may include, for example, deleting one or more files associated with the classified document from the memory of imaging device 110.

At block 355, the completion of the corrective actions may be monitored by server 130. The monitoring may be done by the enterprise content management software running on server 130. Similarly, completion of the forms may be monitored by server 130 at block 358. The enterprise content management system may also issue notifications at predetermined time intervals until the forms have been completed and have the necessary approval(s).

At block 360, if it is determined at block 330 that no corrective actions are needed, or if it is determined at block 350 that the corrective actions have been completed and the forms have been completed and possess the necessary approval(s), a clearance key may be automatically generated by server 130. As described above, the clearance key includes instructions to perform one or more operations by imaging device 110 to prepare imaging device 110 for normal use.

At block 370, the clearance key generated at block 360 is sent to imaging device 110 to automatically reconnect imaging device 110 to network 120 as described above. In some example embodiments, the clearance key is sent to imaging device 110 via an authorized user accessing imaging device 110 on-site, inputting the clearance key and otherwise submitting instructions for wiping/erasing memory, and reconnecting imaging device 110 to network 120. In alternative embodiments, if imaging device 110 periodically check for the status of the clearance key via network 120, the clearance key may be electronically transmitted to imaging device 110.

It will be appreciated that the actions described and shown in the example flowcharts may be carried out or performed in any suitable order. It will also be appreciated that not all of the actions described in FIGS. 2 and 3 need to be performed in accordance with the example embodiments of the disclosure and/or additional actions may be performed in accordance with other embodiments of the disclosure.

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific example embodiments disclosed and that modifications and other embodiments are intended to be included within the scope of the appended claims. Although specific terms are employed herein, they are used in a generic and descriptive sense only and not for purposes of limitation.

What is claimed is:
1. A method of correcting for an unauthorized disclosure of sensitive information at an imaging device, comprising:

receiving, by the imaging device, an indication of the unauthorized disclosure of sensitive information;

receiving or generating, by the imaging device, preliminary information about the unauthorized disclosure;

transmitting, by the imaging device, the indication and the preliminary information to a remote location to initiate an investigation on the unauthorized disclosure;

after receiving the indication, entering a reduced function mode by the imaging device, the reduced function mode enabling the imaging device to perform a reduced set of functions relative to a set of functions that are enabled to be performed during a normal mode of operation;

receiving, by the imaging device, a clearance key when in the reduced function mode; and after receiving the clearance key, exiting the reduced function mode and returning the imaging device to the normal mode of operation by the imaging device, wherein the indication is received via an interface element of a user interface of the imaging device.

2. The method of claim 1, further comprising:

determining whether a predetermined event occurred following the unauthorized disclosure of sensitive information being processed and prior to receiving the indication, and upon an affirmative determination, querying the user for preliminary information via the user interface, wherein the predetermined event is a user terminating a login session on the imaging device; and wherein the preliminary information includes at least one of a time when the unauthorized disclosure occurred, an identifier of the imaging device, and at least one document involved in the unauthorized disclosure.

3. The method of claim 2, wherein upon an negative determination, automatically collecting the preliminary information including at least one of a time when the unauthorized disclosure occurred, an identifier of the imaging device, and at least one document involved in the unauthorized disclosure.

4. The method of claim 1, wherein entering the reduced function mode by the imaging device comprises disconnecting the imaging device from a network serving the imaging device.

5. The method of claim 1, wherein the imaging device includes memory, and the reduced set of functions includes processing the clearance key and deleting at least one file associated with the sensitive information from the memory of the imaging device; and wherein the clearance key comprises code and associated instructions to search the imaging device for data related to a document associated with the unauthorized disclosure of sensitive information.

6. The method of claim 1, further comprising:

establishing a temporary connection to a server via the imaging device;

pinging the server to determine an availability of the clearance key;

automatically exiting the reduced function mode in response to determining, based on the ping(s), the clearance key is available; and limiting access to the reduced set of functions on the imaging device to a specific set of users when in the reduced function mode, a number of users in the specific set being less than a number of users that are allowed to access the set of functions when the imaging device is in the normal mode of operation.

7. The method of claim 1, wherein the imaging device includes memory, and the method further comprises:

determining whether a predetermined event occurred following the unauthorized disclosure processed and prior to receiving the indication; and upon an affirmative determination, querying the user for preliminary information via the user interface;

limiting access to the reduced set of functions on the imaging device to a specific set of users when in the reduced function mode, a number of users in the specific set being less than a number of users that are allowed to access the set of functions when the imaging device is in the normal mode of operation;

receiving, together with or as part of the clearance key, instructions to wipe or erase memory locations of the memory containing at least one file corresponding to the disclosure of sensitive information; and wiping the memory locations in response to receiving the instructions;

wherein the reduced set of functions includes processing the clearance key and deleting at least one file associated with the sensitive information from the memory of the imaging device;

wherein the preliminary information includes at least one of a time when the unauthorized disclosure occurred, an identifier of the imaging device, and at least one document involved in the unauthorized disclosure; and wherein the predetermined event is a user terminating a login session on the imaging device.

8. The method of claim 1, wherein the imaging device includes memory, and the method further comprises:

receiving, together with or as part of the clearance key, instructions to wipe memory locations of the memory containing at least one file corresponding to the disclosure of sensitive information, and in response to receiving the instructions, searching for the memory locations having portions of the at least one file therein, and upon locating the searched-for memory locations, wiping or erasing the searched-for memory locations.

9. A software program product stored in a non-transitory computer-readable storage medium, the software program product having instructions which, when executed by a processor in an imaging device, cause the imaging device to:

receive an indication of an unauthorized disclosure of sensitive information by the imaging device;

receive or generate preliminary information about the unauthorized disclosure;

transmit the indication and the preliminary information to a remote location to initiate an investigation on the unauthorized disclosure;

after receiving the indication, enter a reduced function mode of the imaging device, the reduced function mode enabling the imaging device to perform a reduced set of functions relative to a set of functions performed during a normal mode of operation;

receive a clearance key while in the reduced function mode; and after receiving the clearance key, exit the reduced function mode and returning the imaging device to the normal mode of operation, wherein the indication is received via an interface element of a user interface of the imaging device.

10. The software program product of claim 9, wherein the instructions include instructions for determining if a predetermined event occurs following the unauthorized disclosure of sensitive information being processed and prior to receiving the indication, and upon an affirmative, querying the user for preliminary information via the user interface, the preliminary information includes at least one of a time when the unauthorized disclosure occurred, an identifier of the imaging device, and at least one document involved in the unauthorized disclosure; and wherein the predetermined event is a user terminating a login session on the imaging device.

11. The software program product of claim 10, wherein the instructions include instructions for, upon an negative determination, automatically collecting the preliminary information including at least one of a time when the unauthorized disclosure occurred, an identifier of the imaging device, and at least one document involved in the unauthorized disclosure.

12. The software program product of claim 9, wherein the clearance key is received from a user interacting with the user interface of the imaging device.

13. The software program product of claim 9, wherein the imaging device includes memory, and the reduced set of functions includes receiving at least one clearance key, processing the key and deleting at least one file associated with the sensitive information from the memory of the imaging device based on instructions in the clearance key to search the imaging device for data related to a document associated with the unauthorized disclosure of sensitive information;
wherein the at least one file comprises the data; and
wherein the instructions include instructions for, during the reduced function mode, limiting access to the reduced set of functions on the imaging device to a specific set of users, a number of users in the specific set being less than a number of users that are allowed to access the set of functions when the imaging device is in the normal mode of operation.

14. The software program product of claim 9, comprising sending one or more notifications to one or more authorized personnel to conduct the investigation of the unauthorized disclosure; and wherein the notification(s) each independently comprise at least one of a memo, an immediate action checklist, and a Five W's report.

15. The software program product of claim 9, comprising transmitting metadata of the imaging device used to perform the unauthorized disclosure and metadata of a user of the imaging device corresponding to the unauthorized disclosure to the remote location along with the indication and the preliminary information.

16. The software program product of claim 9, wherein the imaging device includes memory and the instructions include instructions for receiving, together with or as part of the clearance key, instructions to wipe one or more memory locations of the memory containing at least one file corresponding to the disclosure of sensitive information, processing the instructions and in response to processing the instructions, wiping the one or more memory locations; and
wherein the instructions includes instructions for, in response to processing the instructions, searching for the memory locations containing the at least one file corresponding to the disclosure of sensitive information, and upon locating the memory locations, wiping the memory locations.

17. A software program product stored in a non-transitory computer-readable storage medium, the software program product having instructions which, when executed by a processor in a computing device, cause the computing device to:
receive, from an imaging device, preliminary information relating to a possible unauthorized disclosure of sensitive information;
upon an affirmative determination that the possible unauthorized disclosure is an actual unauthorized disclosure, determine whether a corrective action is needed for the actual unauthorized disclosure of sensitive information and identify the needed corrective action;
electronically notify authorized personnel of the needed corrective action and send one or more forms thereto;
determine whether the needed correction action has been undertaken;
determine whether the one or more forms has been completed; and
only upon an affirmative determination that the needed corrective action has been undertaken and that the one or more forms is complete, generate a clearance key for preparing the imaging device for returning to a normal mode of operation.

18. The software program product of claim 17, further comprising instructions for determining, based at least partly upon the preliminary information, whether the possible unauthorized disclosure is the actual unauthorized disclosure.

19. The software program product of claim 17, further comprising instructions for electronically sending the clearance key to at least one of the imaging device and an authorized user thereof.

20. The software program product of claim 17, further comprising instructions for determining whether the one or more forms have at least one approval such that the clearance key is generated upon an affirmative determination that the one or more forms has the at least one approval.

* * * * *